US007140617B2

(12) United States Patent
Popielas et al.

(10) Patent No.: US 7,140,617 B2
(45) Date of Patent: Nov. 28, 2006

(54) SEALING RING FOR AN INTAKE MANIFOLD

(75) Inventors: Frank W. Popielas, Naperville, IL (US); Alexander S. Williamson, Fort Wayne, IN (US); Rohit Ramkumar, Woodridge, IL (US); Troy D. Mc Arthy, Auburn, IN (US); Marsha A. Minkov, Arlington Heights, IL (US); Colin C. Chen, Barrington, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/448,652

(22) Filed: May 30, 2003

(65) Prior Publication Data

US 2004/0239043 A1 Dec. 2, 2004

(51) Int. Cl.
*F02F 11/00* (2006.01)
*F16J 15/02* (2006.01)
*F16L 17/025* (2006.01)

(52) U.S. Cl. ...................... 277/596; 277/615; 277/626; 277/644; 277/648

(58) Field of Classification Search ................ 277/604, 277/615, 594, 596, 626, 644, 607, 648
See application file for complete search history.

(56) References Cited

U.S. PATENT DOCUMENTS

| | | | | | |
|---|---|---|---|---|---|
| 2,294,142 | A | * | 8/1942 | Turner | 277/625 |
| 3,190,322 | A | * | 6/1965 | Brown | 141/387 |
| 3,315,971 | A | * | 4/1967 | Sakurada | 277/615 |
| 3,573,871 | A | * | 4/1971 | Warner | 277/607 |
| 3,575,430 | A | * | 4/1971 | Alpine | 277/615 |
| 4,059,289 | A | | 11/1977 | Morris et al. | |
| 4,369,977 | A | | 1/1983 | Bishop et al. | |
| 4,394,024 | A | * | 7/1983 | Delhaes | 277/619 |
| 4,546,987 | A | * | 10/1985 | Bucher et al. | 277/615 |
| 4,579,353 | A | * | 4/1986 | Bower | 277/615 |
| 4,602,792 | A | * | 7/1986 | Andrick | 277/615 |
| 5,044,340 | A | | 9/1991 | Robnett | |
| 5,058,907 | A | * | 10/1991 | Percebois et al. | 277/626 |
| 5,544,629 | A | | 8/1996 | Ohata et al. | |
| 6,168,168 | B1 | * | 1/2001 | Brown | 277/637 |
| 6,192,849 | B1 | | 2/2001 | Powell | |
| 6,398,269 | B1 | * | 6/2002 | Haussmann | 285/365 |

* cited by examiner

*Primary Examiner*—Alison K. Pickard
(74) *Attorney, Agent, or Firm*—Rader, Fishman & Grauer, PLLC

(57) ABSTRACT

A seal of an annular shape comprising a top bead and a side bead that are tilted inwardly at predetermined angles. The top bead and side bead are integrally formed such that a force exerted on the side bead allows the side bead to cooperate with the top bead to properly seal an intake pipe within a cylinder head. This abstract submitted with the understanding that it will not be used to interpret or limit the scope or meaning of the claims.

18 Claims, 2 Drawing Sheets

SEALING RING FOR AN INTAKE MANIFOLD

TECHNICAL FIELD

The present invention relates to a sealing ring. In particular, the present invention relates to a sealing ring placed within an intake manifold of an internal combustion engine.

BACKGROUND OF THE INVENTION

It is known to utilize seals between the intake pipes of an intake manifold and the cylinder head of an internal combustion engine to prevent gas leakage from the intake pipes into the cylinder head. A conventional seal for an intake manifold is a loose seal, shaped similar to an O-ring seal, with a cross sectional "wedge" shape to seal against mating surfaces. However, conventional intake manifold seals have disadvantages associated with them. For instance, the intake manifold seal may become twisted after installation. The twisted seal can generate a gap between the intake pipe and the cylinder head allowing gas to escape into the cylinder head. In other instances, the seal may easily slip off the intake pipe resulting in gas escaping into the cylinder head. Even if the seal doesn't twist off or slip off the intake manifold, the "wedge" shape of the seal may become pinched between the two mating surfaces causing premature failure of the seal.

SUMMARY OF THE INVENTION

To overcome the above identified problems and other problems associated with conventional intake manifold seals, the present invention is directed to a sealing ring for an intake manifold. The sealing ring has a generally annular shape and includes a top bead and a side bead. Both the top bead and the side bead each have predetermined angles and shapes. Further, the top bead and side bead are integrally formed such that a force exerted on the side bead allows the side bead to cooperate with the top bead to properly seal against the intake manifold.

BRIEF DESCRIPTION OF THE DRAWINGS

The present invention will now be described, by way of example, with reference to the accompanying drawings, in which.

DESCRIPTION OF PREFERRED EMBODIMENT

Figure 1:
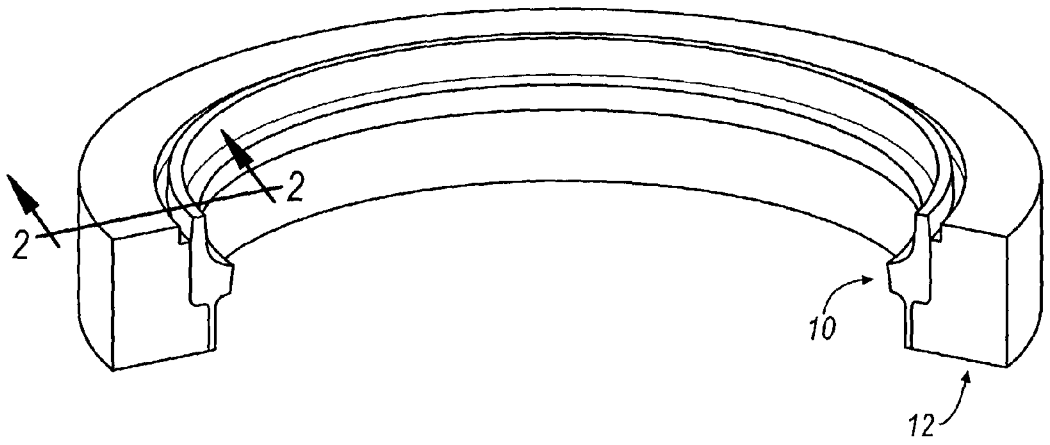
FIG. 1 is a perspective view of a sealing ring according to an embodiment of the present invention.
Figure 2:
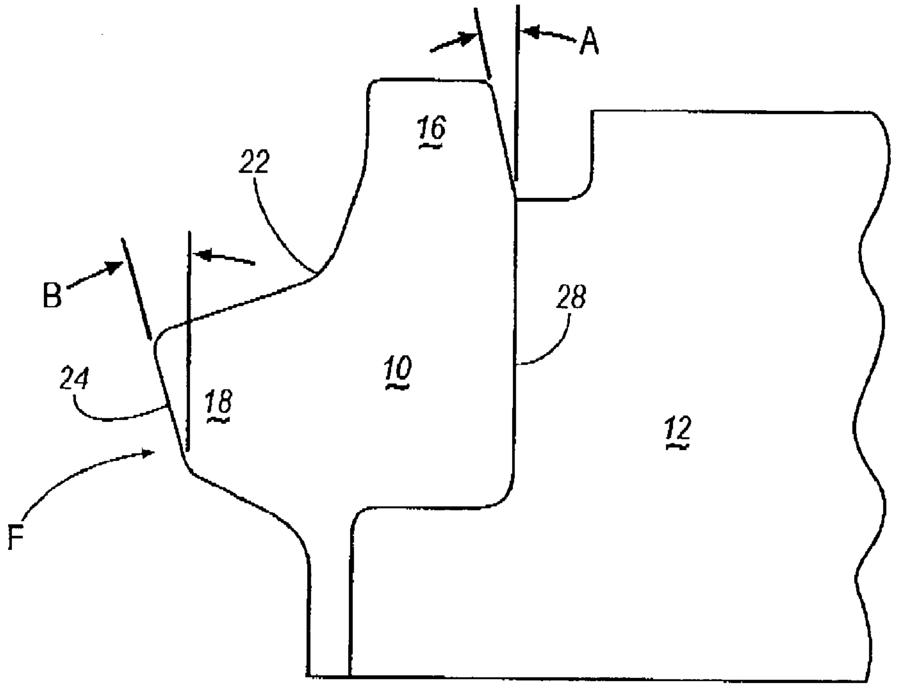
FIG. 2 is a cross-sectional view of the sealing ring in an unloaded condition in accordance with the present invention.
Figure 3:
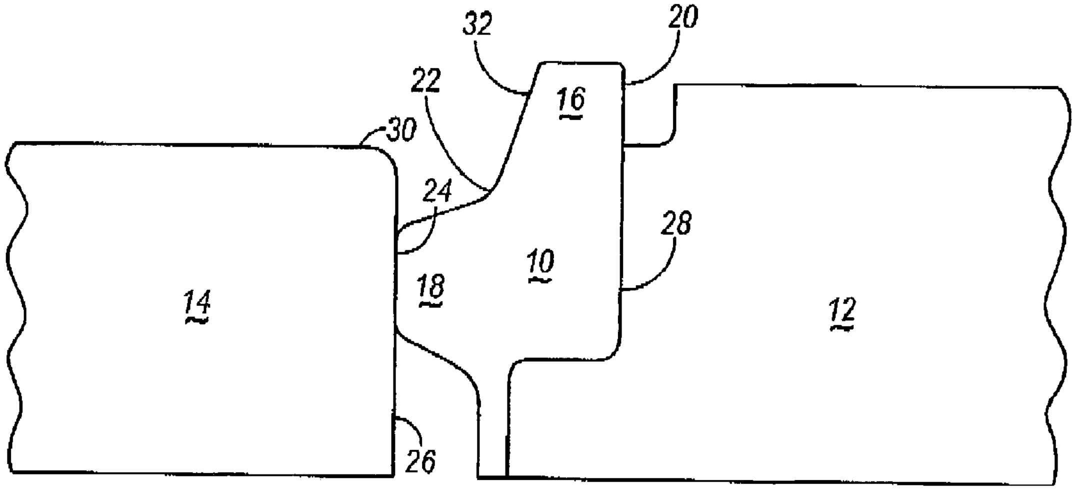
FIG. 3 is a cross-sectional view of the present invention along line 2—2 in FIG. 1.

Referring to FIGS. 1–3, a sealing ring 10, is illustrated according to one embodiment of the present invention. The sealing ring 10 is positioned between the cylinder head 12 of an internal combustion engine (not shown) and the intake pipe 14 of an intake manifold (not shown). FIGS. 1–3 illustrate one intake pipe 14, however, it can be appreciated that the present invention is not limited by the number of intake pipes 14 or the arrangement of the intake pipes 14 within the intake manifold, and may be practiced with any number and arrangement of intake pipes 14.

The sealing ring 10 has a generally annular body that includes a top bead 16 and a side bead 18 and is preferably made of an elastomeric material. The top bead 16 has an outer surface 20 and an inner surface 32. Side bead 18 has an inner surface 24. The top bead 16 and the side bead 18 form a generally reverse L-shape, as best seen in FIG. 2. Top bead 16 and side bead 18 are integrally connected together by a radius 22. The radius 22 maintains the shape of the top bead 16 and the side bead 18 in an unloaded condition. Additionally, the radius 22 assists the side bead 18 in applying the proper amount of force to the top bead 16 so that the top bead 16 will remain flush against the cylinder head 12 in loaded conditions. In one preferred embodiment of the present invention the radius 22 has a dimension of about 1 mm. However, it can be appreciated that the radius 22 may be of any dimension so long as the following two conditions are met: (1) the radius 22 provides the top bead 16 and the side bead 18 with enough stiffness in an unloaded condition and (2) the radius 22 cooperates with the side bead 18 to assist the top bead 16 in remaining flush against the cylinder head 12 under loaded conditions.

Referring to FIG. 2, both the top bead 16 and the side bead 18 are tilted inwardly at predetermined angles in an unloaded condition. In one preferred embodiment of the present invention, the top bead 16 is tilted inwardly at an angle A of about twelve degrees and the side bead 18 is tilted inwardly at an angle B of about fifteen degrees. However, the present invention is not limited by the illustrated embodiment. It can be appreciated that the sealing ring 10 can be practiced with the top bead 16 being tilted inwardly at an angle A within a range of about ten to fourteen degrees and the side bead 18 can be tilted inwardly at an angle B within a range of about thirteen to seventeen degrees.

During insertion of the intake pipe 14 into the cylinder head 12, the intake pipe 14 asserts a force, as shown by arrow F in FIG. 2, onto the side bead 18. The force F acts upon the outer surface 24 of the side bead 18, causing the side bead 18 to compress substantially fifteen degrees. As the side bead 18 is being compressed, the side bead 18 works in conjunction with the radius 22, to cause the top bead 16 to shift approximately twelve degrees to a substantially vertical position. When the intake pipe 14 is fully inserted into the cylinder head 12, as best seen in FIG. 3, the top bead 16 and the side bead 18 are generally parallel with respect to each other. The top bead 16 is parallel with the surface 26 of the intake pipe 14. The side bead 16 is parallel with the surface 28 of the cylinder head 12. The inner surface 24 of the side bead 18 rests below the edge 30 of the intake pipe 14 when the intake pipe 14 is fully inserted into the cylinder head 12.

The sealing ring 10 of the present invention offers advantages over the commercially available intake manifold seals. The predetermined angle of the top bead 16 ensures that the top bead 16 remains substantially vertical and flush against the surface 28 of the cylinder head 12 under loaded conditions. The shape of the top bead 16 prevents the top bead 16 from being pinched between two mating surfaces within the internal combustion engine, thereby causing premature failure of the sealing ring 10. The shape and the predetermined angle of the side bead 18 allows for easy insertion of the intake pipe 14 into the cylinder head 12 once the sealing ring 10 has been positioned within the cylinder head 12. In addition, the shape of the side bead 18 ensures that the inner surface 24 of the side bead 18 remains parallel and flush against the surface 26 of the intake pipe 14 under loaded conditions. The location of the side bead 18 with respect to the edge 30 of the intake pipe 14 ensures that the side bead 18 does not twist or slip off the edge 30 of the intake pipe 14 as conventional seals may.

While the invention has been specifically described in connection with certain specific embodiments thereof, it is to be understood that this is by way of illustration and not of limitation, and the scope of the appended claims should be construed as broadly as the prior art will permit.

What is claimed is:

1. A sealing ring having an upper surface and a lower surface comprising:

a top bead disposed proximate the upper surface, wherein said top bead is tilted inwardly at a predetermined angle;

a side bead disposed between said top bead and the lower surface, wherein a top portion of said side bead is tilted inwardly relative to an intake pipe, at a predetermined angle relative to an axial axis defined by the sealing ring, such that said side bead extends outwardly away from an outside edge of said top bead wherein only said side bead contacts an inside surface of the intake pipe;

wherein said seal has a generally annular shape;

wherein said top bead and said side bead are integrally joined, such that said side bead cooperates with said top bead to properly seal the intake pipe within a cylinder head; and wherein said side bead cooperates with said top bead to ensure said top bead remains flush against a surface of a wall when a force is exerted on said side bead, whereby said top bead and said side bead never overlap.

2. A seal according to claim 1, wherein said side bead is positioned flush against a surface of the intake pipe.

3. A seal according to claim 1, wherein said side bead is positioned below an edge of the intake pipe.

4. A seal according to claim 1, wherein said top bead and said side bead are generally parallel with respect to each other.

5. A seal according to claim 4, wherein said top bead is generally parallel to a surface of the cylinder head and said side bead is generally parallel to said surface of the intake pipe.

6. A seal according to claim 1, wherein said predetermined angle of said top bead is between ten to fourteen degrees.

7. A seal according to claim 1, wherein said predetermined angle of said top bead is twelve degree.

8. A seal according to claim 1, wherein said predetermined angle of said side bead is between thirteen to seventeen degrees.

9. A seal according to claim 1, wherein said predetermined angle of said side bead is fifteen degrees.

10. A seal according to claim 1, wherein said seal is only made of an elastomeric material.

11. A sealing ring comprising:

an annular body defining an aperture and an axial axis between an upper surface and a lower surface, said annular body having an outer surface;

a top bead disposed proximate said upper surface, wherein said top bead is tilted inwardly relative to said axial axis at a predetermined angle;

a side bead disposed between said top bead and said lower surface, wherein a top portion of said side bead is tilted inwardly relative to said axial axis at a predetermined angle such that said side bead extends away from an outside edge of said top bead; and a flange portion extending downwardly from said lower surface;

wherein said top bead and said side bead are integrally joined, such that said side bead cooperates with said top bead so that a force acted upon said side bead is transmitted to said top bead to deform said top bead.

12. A seal according to claim 11, wherein said top bead and said side bead not in an overlapping relationship.

13. A seal according to claim 11, wherein said outer surface is generally parallel to said axial axis.

14. A seal according to claim 11, wherein said flange portion is generally parallel to said outer surface.

15. A seal according to claim 11, wherein said predetermined angle of said top bead is twelve degrees.

16. A seal according to claim 11, wherein said predetermined angle of said side bead is between thirteen to seventeen degrees.

17. A seal according to claim 11, wherein said predetermined angle of said side bead is fifteen degrees.

18. A sealing ring comprising:

an annular body defining an aperture and an axial axis between an upper surface and a lower surface, said annular body having an outer surface generally parallel to said axial axis;

a top bead disposed proximate said upper surface, wherein said top bead is tilted inwardly relative to said axial axis at a predetermined angle;

a side bead disposed between said top bead and said lower surface, wherein a top portion of said side bead is tilted inwardly relative to said axial axis at a predetermined angle such that said side bead extends away from an outside edge of said top bead; and a flange portion extending downwardly from said lower surface;

wherein said top bead and said side bead are integrally joined, such that said side bead cooperates with said top bead so that a force acted upon said side bead is transmitted to said top bead to deform said top bead, wherein said top bead and said side bead are never in an overlapping relationship.

* * * * *